United States Patent [19]

Purcell et al.

[11] Patent Number: 4,819,754

[45] Date of Patent: Apr. 11, 1989

[54] MULTIPLE MODE VEHICLE SUSPENSION SYSTEM

[75] Inventors: Robert J. Purcell, Washington; Robert R. Farris, Peoria, both of Ill.

[73] Assignee: Caterpillar Inc., Peoria, Ill.

[21] Appl. No.: 137,553

[22] Filed: Dec. 23, 1987

[51] Int. Cl.$^4$ .................. B60G 5/06; B60G 13/06; B62D 55/14

[52] U.S. Cl. .................. 180/9.1; 180/24.02; 280/678; 280/683; 280/702; 305/10

[58] Field of Search .................. 180/9, 9.1, 9.5, 9.52, 180/9.54, 9.56, 9.6, 22, 24, 24.02, 24.11, 24.12, 6.54, 6.7; 280/678, 683, 104, 6 H, 702, 611; 305/10, 21, 22, 24, 27, 28

[56] References Cited

U.S. PATENT DOCUMENTS

| | | | |
|---|---|---|---|
| 3,063,510 | 11/1962 | Hunger et al. | 180/9.1 |
| 3,254,738 | 6/1966 | Larsen | 180/9.1 |
| 3,343,619 | 9/1967 | Johansson | 180/9.1 |
| 3,550,993 | 12/1970 | Peiffer | 280/6 H |
| 3,602,470 | 8/1971 | Reynolds | 180/9.1 X |
| 3,740,070 | 6/1973 | Butler et al. | 280/683 |
| 3,879,052 | 4/1975 | Butler et al. | 280/685 |
| 4,047,736 | 9/1977 | Prive | 280/683 |
| 4,230,341 | 10/1980 | Hart et al. | 280/702 |
| 4,420,167 | 12/1983 | Winblad | 280/6 H |

FOREIGN PATENT DOCUMENTS

2947974 7/1981 Fed. Rep. of Germany ........ 305/10

Primary Examiner—David M. Mitchell
Assistant Examiner—Mitchell J. Hill
Attorney, Agent, or Firm—Joseph W. Keen

[57] ABSTRACT

A suspension system for a vehicle equipped with a pair of belts arranged on opposite lateral sides of the vehicle's frame wherein each belt is entrained about an elevated drive wheel, a front and a rear idler wheel, and roller wheels arranged longitudinally between the idler wheels. Resilient front, intermediate, and rear struts connected respectively between the frame and a support apparatus of which the front idler comprises a portion, between the frame and one set of roller wheels, and between the frame and the rear idler wheel provide the vertical support for the vehicle's frame. Fluid interconnection of the front struts provides lateral load sharing during low speed vehicle operation and, during high speed vehicle operation, fluid interconnection of each front strut with its own accumulator provides independent suspension. Selective fluid interconnection of the rear strut with a recoil strut which provides the desired belt tension maintains belt to wheel engagement for high speed vehicular operation. Selective fluid isolation of the rear strut and a pry-out strut connected between the recoil strut and a pivoting beam on which the front idler is mounted enables application of the maximum vertical forces on vehicle attached implements.

11 Claims, 3 Drawing Sheets

MULTIPLE MODE VEHICLE SUSPENSION SYSTEM

TECHNICAL FIELD

This invention relates to a suspension system for a work vehicle, and, more particularly, to a suspension system which may be readily changed to selectively provide optimal characteristics for high speed vehicular operation or low speed vehicular operation.

BACKGROUND ART

In high speed vehicular operation (especially when significant vehicular weights are involved) a vehicle suspension system capable of load sharing between longitudinally separated wheels is necessary to prevent the subjection of terrain induced impact loads on the vehicle chassis, reduce the load carrying capability of individual support wheels, and maintain a stable chassis orientation regardless of the terrain. The following U.S. patents illustrate typical longitudinal load sharing capability for high speed vehicles: U.S. Pat. Nos. 3,254,738; 3,740,070; 3,879,052; 4,047,736; 4,230,341; and 4,420,167.

Low speed, work vehicles in contradistinction to high speed vehicles, additionally require lateral side to side load sharing for maintaining maximum tractive engagement with the terrain. Such work vehicles often have an implement attached either to the front or rear end of the chassis whose purpose is, depending on the application, to exert either an upward or downward penetrating force on the earth. In such instances maximum force on the implement can be exerted by vertically pivoting the entire vehicle's chassis about the frontmost or rearmost (depending on the mounting location of the implement and the desired direction of force application) ground engaging member which usually constitutes a wheel. Such vehicle chassis pivoting can only be accomplished if longitudinal load sharing is not permitted between ground engaging members adjacent the chassis end in question and the remaining ground engaging members. None of the above patents has such implement application force maximizing capabilities.

Only recently has the inherent tractive advantage of track laying vehicles been combined with the high speed travel capability of wheel equipped vehicles to provide a work vehicle supported on and driven by elastomeric belts. In general, such work vehicle includes on each lateral side of its frame, wheels arranged in supporting relation to its frame and entrained within such belt with at least one of such wheels being frictionally engaged with the belt. With the advent of such work vehicle, both high speed mobility and low speed draft work may be optimally accomplished with one vehicle. However, use of a high speed suspension system on a belted vehicle also necessitates maintaining engagement between the belt and entrained wheels for all configurations assumable by those wheels in order to guide the belt and prevent it from being thrown from its entraining position around same. None of the above described patents has such belt to wheel engagement assurance provisions.

U.S. Pat. No. 3,254,738 ('738) provides the desired side to side load sharing and certain aspects of longitudinal load sharing between wheels/idlers using hydraulic circuits exclusively without any mechanical connection of the wheels. The '738 patent lacks provisions for maximizing the vehicle's capability of exerting penetration force on attached implements by virtue of the vehicle's longitudinal load sharing between wheels; and provides the side to side load sharing in a very complex hydraulic manner.

To take full advantage of a belted vehicle's high speed travel capabilities as well as its tractive advantages in low speed work applications, its suspension system must be able to provide the dynamic characteristics best suited for the operational mode selected (be it high speed or low speed) and do so with a minimum of complexity.

DISCLOSURE OF THE INVENTION

The present invention is directed to overcoming one or more of the above problems.

There is provided a suspension system which is readily adaptable to a high speed, vehicular traveling mode and a low speed, vehicular work mode. The suspension system has two suspension mechanisms which are arranged on opposite lateral sides of and in supporting relation to a vehicular frame with each suspension mechanism including a vehicle support apparatus, a rear idler wheel assembly, a drive wheel assembly elevated above the rear idler wheel assembly, an elastomeric belt entrained about the vehicle support apparatus and the wheel assemblies and in frictional engagement with the drive wheel assembly, a rear resilient strut connected between the frame and the rear idler assembly, a front resilient strut connected between the frame and the vehicle support apparatus, and a recoil strut connected between the frame and support apparatus for maintaining a predetermined belt tension. Each vehicle support apparatus includes a front idler wheel assembly rotatably connected to one end of a pivoting beam, a roller wheel assembly pivotally connected to the opposite end of the pivoting beam, and a wheel juncture device to which the rocking bar is pivotally connected.

In one aspect of the present invention corresponding chambers in the front struts are selectively fluidly connected for low speed operation and, during high speed operation, are fluidly segregated and respectively fluidly connected to separate accumulators.

In another aspect of the present invention one of the chambers defined by the rear strut's components is, during high speed operation, fluidly interconnected with an accumulator and a chamber defined by the recoil strut's components and is, during low speed operation, fluidly isolated from the connected recoil strut's chamber and accumulator.

In yet another aspect of the present invention a chamber of a pry-out strut connected between the wheel juncture device and one end of the pivoting beam is, during high speed operation, fluidly connected with both another chamber of the pry-out strut and an accumulator and, during low speed operation, is fluidly isolated.

During high speed operation, the suspension system mechanisms operate independently with each providing longitudinal load sharing between its wheel and roller assemblies and each ensuring continued belt entrainment of the wheel and roller assemblies for various degrees of recoil strut retraction. During low speed operation, however, the suspension system mechanisms laterally load share, ensure application of maximum force on attached implements by preventing each idler wheel assembly from sharing load in the longitudinal direction, and maintaining the ability to permit recoil of the front idler assembly when the entraining belt's tension rises above a predetermined level.

BEST MODE FOR CARRYING OUT THE INVENTION

Figure 1:
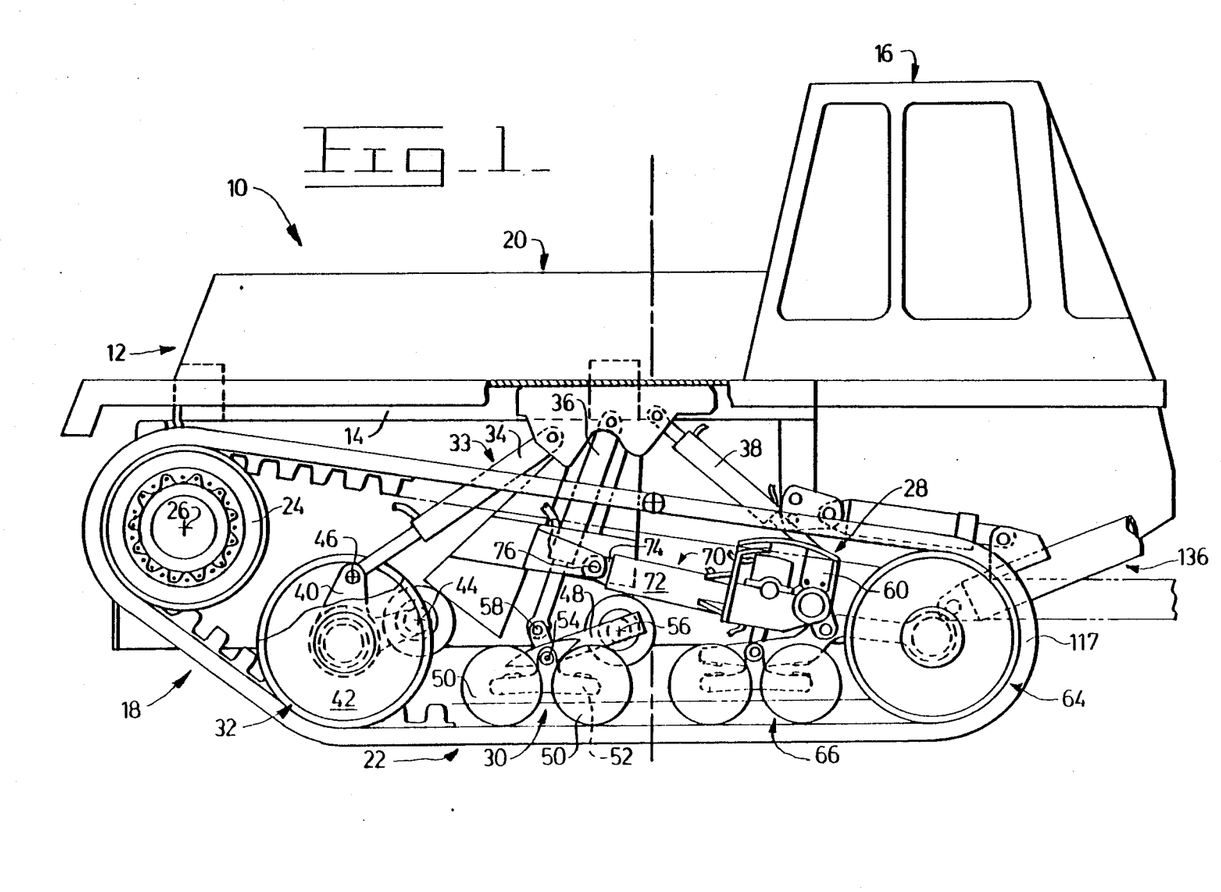
FIG. 1 is a right side elevational view of a vehicle employing a suspension system constructed in accordance with the present invention and a fragmentary portion of a front-mounted implement such as a bulldozer blade.

Referring now to FIG. 1, an elevational view of a vehicle 10 of the endless track laying type is shown having a chassis 12 which includes a longitudinally extending main frame 14 and an operator's station 16 disposed at the longitudinal front end of the chassis 12. The chassis 12 is resiliently supported by a suspension system 18 which includes left hand and right hand suspension mechanisms 20 and 22, respectively. Since the left hand suspension mechanism 20 (not shown from the vantage point of FIG. 1) is a mirror image of the right hand suspension mechanism 22, only the right hand suspension mechanism 22 will be discussed hereinafter.

The suspension mechanism 22 includes a drive wheel assembly 24 rotatably mounted about a fixed axis 26 on the main frame 14 at a position elevated above the terrain, a vehicle support apparatus 28, a rearward guide roller assembly 30 disposed longitudinally rearward from the support apparatus 28, a rear idler wheel assembly 32 longitudinally disposed between the drive wheel assembly 24 and the rear guide roller assembly 30, and means 33 for resiliently connecting the rear idler wheel assembly 32, the rear guide roller assembly 30, and vehicle support apparatus 28 to the vehicle main frame 14. It is to be understood that pivot axes described hereafter shall constitute longitudinal axes through pins or other similar connecting members well known to those skilled in the art.

The resilient connecting means 33 respectively includes a rear strut 34, center strut 36 and forward strut 38 which respectively connect to the rear idler assembly 32, the rear guide roller assembly 30, and the vehicle support apparatus 28. The rear idler wheel assembly 32 includes a bellcrank apparatus 40 and an idler wheel 42 rotatably connected to the bellcrank 40 which is pivotally connected to the main frame 14 about a pivot axis 44 and is pivotally connected to the rear strut 34 about a pivot axis 46. The guide roller assembly 30 includes a rocking beam 48 and a pair of roller wheels 50 which are rotatably mounted on a bogie beam 52 which in turn is pivotally mounted on the rocking beam 48 about a pivot axis 54. The rocking beam 48 is pivotally mounted on the vehicle's main frame 14 about a pivot axis 56 and is pivotally connected to the intermediate strut 36 about a pivot axis 58. The vehicle support apparatus 28, as better illustrated in FIGS. 2 and 3, includes a wheel juncture device 60, a recoil guide structure 62, a front or idler wheel assembly 64, a following wheel assembly or guide roller assembly 66, and a pivoting beam 68.

The suspension mechanism 22 also includes a recoil strut 70 having a head end portion 72 and a rod end portion 74 which are respectively pivotally mounted on frame 14 about a pivot axis 76 and joined to wheel juncture device 60. As best illustrated in FIG. 3, the recoil guide structure 62 includes a first member 78 which is pivotally mounted on the frame 14 about a pivot axis 80, a second member 82 which is fixed to the first member 78 and is pivotally attached to support strut 38 about a pivot axis 84, and a support element 86 which protrudes into and is rotatably mounted on the second member 82 about a pivot axis 87 and has a pivot axis 88.

The wheel juncture device 60 is mounted on the support element 86 so as to be pivotable about pivot axis 88. The pivoting beam 68 is pivotally mounted on the wheel juncture device 60 about a pivot axis 89. The guide roller assembly 66 includes a pair of rollers 90 which are rotatably mounted on a bogie 92 which, in turn, is pivotally mounted on one arm 94 of the pivoting beam 68 about a pivot axis 97. The front idler wheel assembly 64 is rotatably mounted on a second arm 96 of the pivoting beam 68 about an axis of rotation 98. A pry-out strut 100 has a rod end 102 and a head end 104 which are respectively pivotally connected to the first arm 94 about the pivot axis 97 and to the wheel juncture device 60 about a pivot axis An inextensible elastomeric belt 117 is entrained about the idler wheel assemblies 32,64, guide roller assemblies 30,66, and drive wheel assembly 24. The belt 117 is suitably tensioned by the recoil strut 70 acting through the front idler wheel assembly 64 such that the belt 117 is frictionally coupled with the drive wheel assembly 24. Rotation of the drive wheel assembly 24 in the desired direction induces movement of the belt 117 to drive the vehicle 10.

Figure 2:
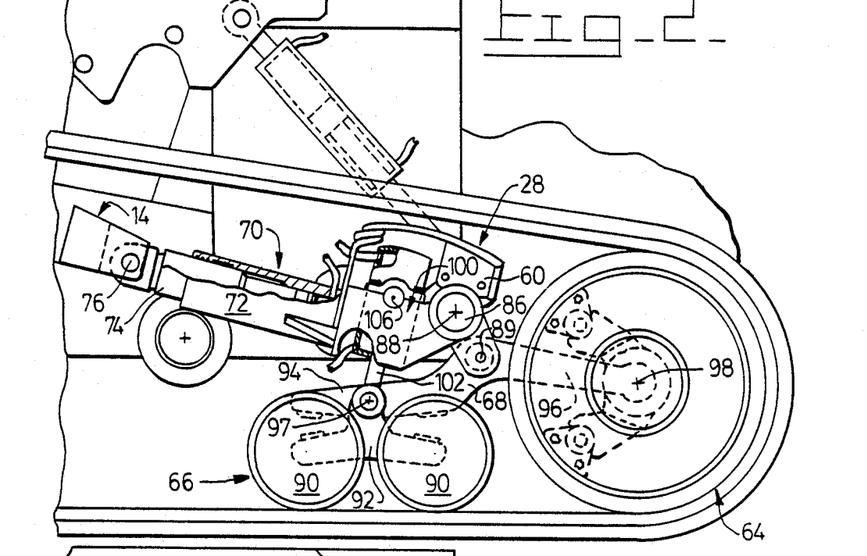
FIG. 2 is a diagrammatic and enlarged right side elevational view of the front end portion of the suspension system shown in FIG. 1 with portions shown broken open or in broken lines to better illustrate details of construction thereof.
Figure 3:
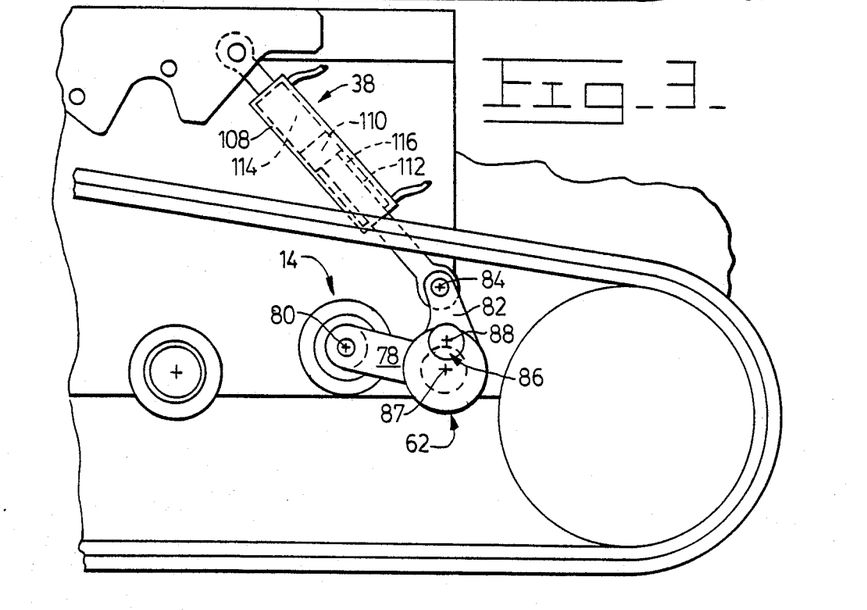
FIG. 3 is a diagrammatic view similar to FIG. 2 with many of the components deleted in order to show certain laterally inwardly spaced elements otherwise hidden in FIG. 2.

Each of the struts 34,36, and 38 described herein include, as illustrated for the front strut 38 in FIG. 3, a cylinder 108 and a piston 110 longitudinally displaceable within the cylinder 108 and having a portion thereof which constitutes a rod 112 extending from one end of the cylinder 108. A first and a second chamber 114 and 116 are respectively defined by the components of the strut 34. A third and a fourth chamber 114A and 116A are respectively defined by the components of the strut 36. A fifth and a sixth chamber 114B and 116B are respectively defined by the components of the strut 38 wile the components of a strut 38A (constitutes a part of the left hand suspension mechanism 20) defined a seventh and an eighth chamber 114C and 116C. A ninth and tenth chamber 114D and 116D are respectively defined by the components of the strut 100. The aforementioned struts 34, 36, 38 and 100 are illustrated in FIGS. 2–7. Recoil strut 70, however, includes, by virtue of its, components' construction, only an eleventh chamber 114E. For purposes of clarity and simplicity, fluid conduits to the various struts have been illustrated as stub or cut-off hose members in FIGS. 1-3 but have been schematically illustrated in full in FIGS. 4-7.

In the description of FIGS. 4-7 hereafter, it is to be understood that the illustrated or first position of each valve described hereafter constitutes the position corresponding to the high speed operation mode of the vehicle 10 and that the second (not illustrated) position corresponds to the low speed, work operation mode of the vehicle 10. It is to be further understood that while the valves are illustrated as being solenoid actuated, any valve actuation is considered acceptable and within the purview of the instant invention.

Figure 4:
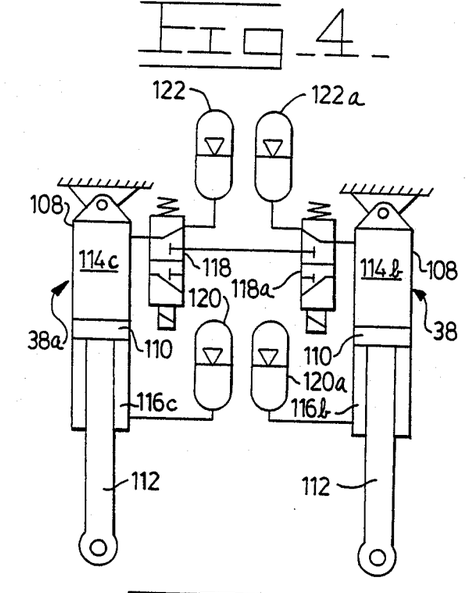
FIG. 4 is a semi-schematic view of the vehicle's front struts and their fluid interconnections.

FIG. 4 is a semi-schematic illustration of the vehicle support struts 38 disposed on opposite lateral sides of the vehicle 10 and their hydraulic interconnection with other fluid handling devices. The head end or chamber 114B and 114C of support struts 38 and 38A are respectively connected to a first port of a valve 118 and to a first port of a valve 118A and the second chamber 116B and 116C are respectively fluidly connected to third and fourth accumulators 120A and 120. Each valve 118 is selectively disposable in a first (illustrated) and a second position and includes second and third ports. When disposed in the first position, each of the valves 118 respectively connect the first and second ports and obstruct fluid flow through the third port. When disposed in the second position, each of the valves 118 and 118A fluidly interconnects the first and third ports. Fifth and sixth accumulators 122 and 122A are respectively fluidly interconnected with the second port of the valves 118 and 118A.

Figure 5:
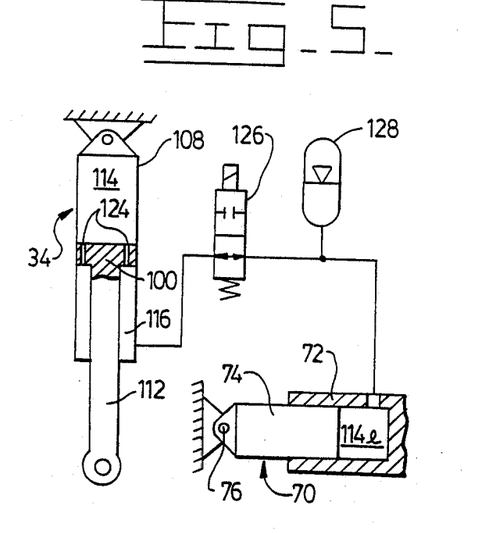
FIG. 5 is a semi-schematic view of one lateral side of the vehicle suspension illustrating a rear strut and its fluid interconnection with a recoil strut.

FIG. 5 is a semi-schematic illustration of the rear support strut 34, the recoil strut 70, and their fluid interconnection with various fluid handling devices. The piston 110 in the strut 34 includes ports or openings 124 which provide fluid communication between the chambers 114 and 116. A valve 126 having a first and a second port is disposable between a first (illustrated in FIG. 5) and a second position as desired. In its first position the valve 126 provides fluid communication between chamber 116 of strut 34 and chamber 114E of the associated recoil strut 70 which constitutes a part of the same suspension mechanism. A first accumulator 128 is maintained in fluid communication with chamber 114E of the recoil strut 70. When valve 126 is disposed in its second position, fluid communication between chamber 116 of strut 34 and accumulator 128 is obstructed.

Figure 6:
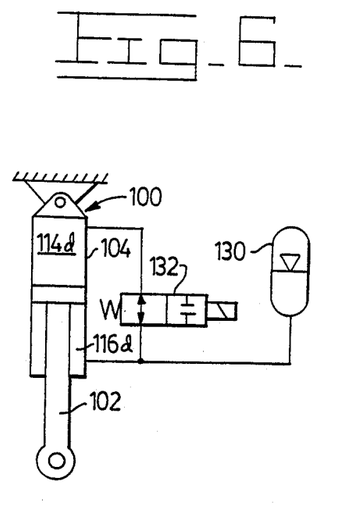
FIG. 6 is a semi-schematic view of a pry-out strut and its fluid interconnection with an accumulator.

FIG. 6 is a semi-schematic view of the pry-out strut 100 and its hydraulic interconnection with various fluid handling devices such as a seventh accumulator 130. valve 132 is disposable in a first (illustrated) and a second position and includes first and second ports which are respectively fluidly connected to chambers 114D and 116D of the pry-out strut 100. The accumulator 130 is maintained in continuous fluid communication with chamber 116D of the pry-out strut 100. When valve 132 occupies the first position, fluid communication between chamber 114D and chamber 116 of strut 100 is provided. When valve 132 is disposed in its second position, fluid communication between chambers 114D and 116D of strut 100 is obstructed.

Figure 7:
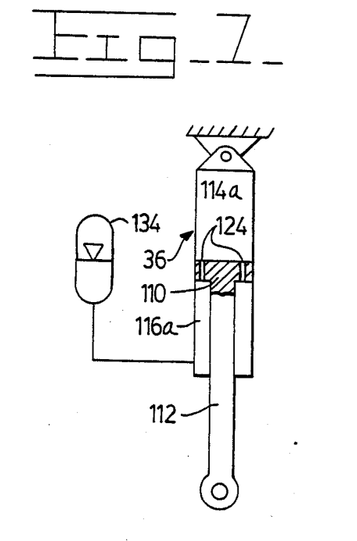
FIG. 7 is a semi-schematic view of an intermediate strut and its fluid interconnection with an accumulator.

FIG. 7 is a semi-schematic of intermediate strut 36 illustrating its piston 110 having ports or openings 124 therethrough between strut 36's chambers 114A and 116A. A second accumulator 134 is in continuous fluid communication with chamber 116A of strut 36.

Referring again to FIG. 1, a conventional front mounted implement 136 such as a bulldozer blade, only a fragment of which is illustrated, is connected to the main frame 14 beneath the operator's station 16. Such implement is visible and effective to move earth or the like with movement of the vehicle 10. It is to be understood that a similar earthworking implement, while not illustrated, could be joined to the vehicle 10 at its rear end for purposes of performing similar earthworking tasks.

INDUSTRIAL APPLICABILITY

In operation, the suspension system 18 has been designed to accommodate and traverse obstacles of approximately eight inches in height without unduly disturbing the chassis 12 including the operator's station 16. Assuming the suspension system 18 has been set for high speed operation and a forward travel direction, the drive wheel assembly 24 is rotated in a clockwise direction as viewed from the vantage point of FIG. 1 at the desired rate of speed to propel the endless elastomeric belt 117 in a clockwise direction. When the belt 117 and front idler wheel assembly 64 encounter an obstacle, a thrust component is longitudinally rearwardly directed against the recoil strut 70 through the pivoting beam 68 and vehicle support apparatus 28. The chamber 114E of the recoil cylinder 70 is continuously pressurized by fluid as shown in FIG. 5 to a pressure level sufficient to urge the vehicle support apparatus 60 forwardly with a relatively high nominal force of approximately 34,000 lbs. under static conditions. The support element 86 is allowed to initially travel rearwardly in a nearly horizontal but arcuate path about the pivot axis 87. Thereafter, the front idler wheel assembly 64 is elevated such that the pivoting beam 68 rotates in a counterclockwise direction about the pivot axis 89 causing the vehicle support apparatus 60 to move incrementally rearwardly relative to the pivot axis 76 and forcing some fluid from the recoil strut's chamber 114 into the accumulator 128 and chamber 114E of the rear strut 34. Since the front idler wheel assembly 64 is on the front leg 96 of the pivoting beam 68, the upward movement thereof exerts a downward force on the bogie 92 and then on the roller wheels 90 against the interior of the belt 117. The pry-out strut 100 best illustrated in FIGS. 1, 2, and 6 dampens or inhibits counterclockwise movement of the pivoting beam 68 to a limited degree by expelling fluid from chamber 116D of strut 100 into chamber 114D thereof and, at the same time, transmitting sufficient fluid from the accumulator 130 into chamber 114D to take up the volumetric difference between the chambers 114D and 116D. With upward movement of the pivot axes 88 and 89, the piston rod 112 of the front strut 38 is moved upwardly within the cylinder 108 causing fluid from its chamber 114B to be expelled therefrom into the accumulator 122A when the valve 118A occupies the position shown in FIG. 4. Such upward movement of the piston rod 112 causes additional fluid to be drawn into chamber 116B of strut 38 from accumulator 120A.

When the obstacle in question, such as a tree limb, is traversed by the drive belt 117 to a point where such obstacle is located between the front idler wheel assembly 64 and the front roller wheel assembly 66, the bogie member 92 reverses from a clockwise movement relative to the pivoting beam 68 to a counterclockwise movement. As the obstacle is further traversed and becomes located beneath the front roller wheel 90, the bogie member 92 rotates in a counterclockwise direction. At this point the obstacle is nearly directly under the pry-out strut 100 causing a substantial upward force component on the piston rod 102 thereof. As a result, fluid is expelled from the pry-out strut's chamber 114D into the pry-out strut's chamber 116D and the accumulator 130 at a progressively increasing pressure level to yield the desired cushioning effect. Further traversal of the obstacle causes its passage beneath the rear roller wheel 90, and clockwise rotation of the bogie member 92. As the obstacle passes from under the rear roller wheel 90, the bogie member 92 rotates in a counterclockwise direction until the illustrated equilibrium position of FIGS. 1 and 2 is reached and fluid flows from the accumulator 130 and chamber 116D into chamber 114D of the pry-out strut 100.

Subsequently, the effective rearward travel of the obstacle under the forward roller wheels 50 and belt 117 causes counterclockwise movement of the rear bogie member 52. The rocking beam 48 rotates in a clockwise direction about the pivot axis 56 causing fluid to be expelled from the chamber 114A of strut 36 through ports 124 into chamber 116A of strut 36 and into accumulator 134 under an increasing pressure level. As the obstacle passes under the rear roller wheels 50, clockwise moment of the rear bogie member 52 is induced. Further traversal of the obstacle causes: the bogie member 52 and rocking beam 48 to return to their equilibrium positions illustrated in FIG. 1; and fluid flow reversal from that described heretofore with respect to the strut 36.

As the obstacle travels under the rear idler wheel 42, clockwise movement of the support member 40 about pivot axis 44 is induced causing the piston 110 and rod 112 of strut 34 to move further into strut 34's cylinder low. Such movement causes fluid to be expelled from chamber 114E of the strut 34 into chamber 116 of strut 34, chamber 114 of recoil strut 70 and the accumulator 128 as illustrated in FIG. 5. As a result, cylinder 72 of the recoil strut 70 is urged forwardly causing vehicle support apparatus 60 to bias the front idler wheel assembly 64 forwardly to maintain proper tension of the drive belt 117 under the increased pressure levels established by accumulator 128. As the obstacle passes from under the rear idler wheel assembly 32, the above described movements of components and fluid are reversed until the rear idler wheel assembly 32 again assumes the equilibrium position shown in FIG. 1.

As is apparent from viewing FIG. 1, the drive wheel assembly 24 is elevated relative to the idler wheel assemblies 32,64 and guide rollers 50,90 and is not a part of the suspended undercarriage which must be included in the dynamic suspension system 18 for supporting the chassis 12. Since the drive wheel assembly 24 is not a part of the suspension system 18, no provisions need be made to accommodate movement of the rotation axis 26 thereof resulting in simplification of the power train structure's interconnection with the drive wheel assembly 24 and providing greater vehicle reliability. Moreover, while other drive wheel assemblies which are disposed at ground level are prone to ingestion of mud and debris which can result in slippage of the drive belt relative to such drive wheel assemblies, the elevated location of the instant drive wheel assembly 24 provides an opportunity for gravity to clean the belt 117 and promote frictional engagement of the belt 117 and drive wheel assembly 24 before such debris reaches the drive wheel assembly 24.

The hydraulic subsystems schematically illustrated in FIGS. 4–7 provide optimal movement characteristics of the suspension system 18 for relatively high rates of vehicular speed or, alternatively, movement characteristics providing optimal tractive effort and a stable work platforms for relatively low, working rates of vehicular speed. Soft spring rate action of the struts 34,36,38A,70, and 100 is desired when the vehicle 10 is traveling at high speeds and is provided by disposing the valves 118A,126, and 132 in the positions illustrated in FIGS. 4, 5, and 6. On the other hand, when moving earth at low speeds such as through the use of the front mounted bulldozer 136, it is desirable to move the valves 118A, and 126 to their second (not illustrated) position. Movement of valve 132 to its second position will occur during low speed operation but only when it is desired to exert an upward force on the bulldozer 136 for purposes such as "prying out" a tree stump, boulder, or other object.

Referring now to FIG. 4, when the valves 118A are placed in their second position, their first ports are respectively fluidly connected with the chambers 114C and 114B of the struts associated therewith, fluid flow through the second ports of valves 118A is obstructed, and the third ports of the valves 118A are fluidly connected to their first ports, such that the chambers 114C and 114B of the struts 38A and 38 are fluidly interconnected and the accumulators 122 and 122A are isolated from accepting or providing fluid to those struts 38A and 38. The resulting action is a "side to side" or "equalizer bar" load sharing between the vehicle support apparatus 60 arranged on opposite lateral sides thereof. Accordingly, when an obstacle is encountered by the vehicle support apparatus 60 or the wheel or roller guide assemblies thereof, an upward force on the piston 110 of strut 38 will cause fluid to be expelled from that strut's chamber 114B and into the chamber 114C of the other strut 38A. Accordingly, when an obstacle is encountered and traversed by one vehicle support apparatus 60, the increased force exerted on the strut 38 connected thereto will be transferred to the other strut 38A located on the opposite lateral side of the vehicle and a downward force will be exerted on the piston 110 of such other strut 38A to laterally "balance" the load on the oppositely disposed vehicle support apparatus 60.

Referring now to FIG. 5, when valve 126 is disposed in its second position, the position of the piston 110 of strut 34 is effectively locked in position since fluid communication between the first and second ports of the valve 126 is precluded. In such second position, however, the recoil strut 70 retains its ability to absorb shock and accommodate obstacles longitudinally encountered and/or traversed by maintaining the chamber 114 of the recoil strut 70 in continuous fluid communication with the accumulator 128. Accordingly, upon encountering such obstacles, the cylinder 72 of recoil strut 70 will move to further develop its associated piston 74 and expel fluid from the chamber 114 into the accumulator 128 at increasing pressure. Such action closely simulates a conventional recoil system which uses springs to maintain belt tension. Moreover, when the piston 110 of strut 34 is fixed in position, the vehicle can exert its maximum moment about the rear idler wheel assembly 32 for purposes of inserting an implement such as the illustrated bulldozer 136 into the ground. Maximum penetration force thereof can be exerted only by fixing the position of the rear idler wheel assembly 32.

Turning now to FIG. 6, the valve 132 is moved to its second position for purposes of preventing retraction of the piston 110 of strut 100. In such second position, fluid communication between the first and second ports on the valve 132 are blocked to prevent fluid expulsion from the chamber 114D of the pry-out strut 100. By preventing expulsion of fluid from chamber 114D of pry-out strut 100, the pivoting beam 68 will no longer pivot and provide longitudinal load sharing between the front idler wheel assembly 64 and the trailing guide roller assembly 66. Accordingly, the maximum upward force for prying upwardly on rock or other objects can be exerted on a front mounted implement such as the bulldozer 136 by causing the entire vehicle to pivot and exert a downwardly directed moment about the front idler assembly 64. If, however, when the valve 132 is disposed in its second position, a void in the terrain occurs under the guide wheel assembly 66, the piston rod 102 of the strut 100 will move downwardly (resisted only by the vacuum force exerted thereon from the chamber 114D) and permit fluid in the chamber 116D to be expelled into the accumulator 130 under increasing pressure. Such increasing pressure prevents impact engagement of the piston joined to the rod 102 and the cylinder 104 of the pry-out strut 100.

As may be appreciated from viewing FIGS. 1 and 7, movement of the rear roller guide assembly 30 is permitted regardless of the vehicular travel speed. Thus, when an obstacle or terrain irregularity is encountered beneath one or both of the guide wheels 50, the piston 110 and associated rod 112 of the strut 36 will be biased upwardly as viewed in FIG. 7 so as to expel fluid from chamber 114A through ports 124 and into chamber 116A of strut 36 and accumulator 134 under increasing pressure. When the subject obstacle disappears or when a void appears beneath the guide wheel assembly 30, the piston 110 and associated rod 112 will be biased downwardly until an equilibrium position is reached wherein the fluid force in the chamber 116A equals the sum of the fluid force in the chamber 114A and the upward force exerted on the rod 112A. Fluid will be biased into chamber 114 from chamber 116A and accumulator 134 under decreasing pressure conditions. By proper sizing of the ports 124, a dampening action for the strut 36 can be obtained to smooth the ride and improve performance of the suspension system 18.

It is now apparent that a suspension system 18 has been provided which is readily adaptable to high speed vehicular movement and to reduced, working speeds. At high speeds independent side to side suspension characteristics are provided, longitudinal load sharing is provided, and the belt 117 is maintained at the desired tension to insure continued belt to wheel engagement thus preventing the belt 117 from being disentrained from the drive, idler, and guide wheels. On the other hand, optimal suspension characteristics are provided for the low speed, vehicular working mode in which lateral side to side load sharing is desired and maximum force can be exerted on earthworking implements attached to the vehicle. Such dual purpose vehicle enables transportation costs thereof to be minimized while retaining the optimal work characteristics of conventional earthworking vehicles.

We claim:

1. A suspension system for a vehicle having a frame with opposite lateral sides comprising:
   first and second vehicle support apparatus disposed on opposite lateral sides of said frame wherein each support apparatus includes a wheel juncture device, a front wheel assembly, a following wheel assembly, and a pivoting beam connecting said wheel assemblies and being pivotally connected to said wheel juncture device;
   first means for resiliently connecting the first vehicle support apparatus and the frame including a first strut having a fifth and a sixth chamber;
   second means for resiliently connecting the second vehicle support apparatus and the frame including a second strut having a seventh and an eighth chamber;
   a third, fourth, fifth, and sixth accumulator respectively associated with said eighth, sixth, seventh, and fifth chambers wherein said third and fourth accumulators are in respective fluid communication with said eighth and sixth chambers; and
   means for selectively fluidly connecting said fifth and seventh chambers with their associated accumulators and for selectively fluid connecting said fifth chambers, wherein said sixth chamber and said eighth chamber are fluidly isolated from said fifth and seventh chambers.

2. The suspension system of claim 1 wherein said means for selectively fluidly connecting comprises:
   a first and a second valve each of which is selectively disposable in a first and a second position wherein said first and second valves, when disposed in said first position, obstruct fluid communication between said fifth and seventh chambers while providing respective fluid communication between said fifth accumulator and seventh chamber and between said sixth accumulator and said fifth chamber and, when both valves are disposed in said second position, fluid communication between said fifth and seventh chambers is provided and fluid communication between the associated fifth chamber and sixth accumulator is obstructed.

3. The suspension system of claim 1 wherein said means for fluidly connecting, when providing fluid communication between said chambers, fluidly isolates said fifth and seventh chambers from their associated accumulators.

4. The suspension system of claim 1 wherein said means for fluidly connecting, when providing fluid communication between said associated chambers and accumulators, obstructs fluid communication between said fifth and seventh chambers.

5. A suspension system for a vehicle having a frame and a longitudinally separated vehicle support apparatus and idler wheel assembly, said suspension system comprising:
   a recoil strut having a proximal member joined to said frame about a pivot axis, a distal member joined to said vehicle support apparatus, and an eleventh chamber defined by said proximal and distal members;
   second means for resiliently connecting said frame and said idler wheel assembly, said second means includes a suspension strut having a proximal member joined to said frame, a distal member joined to said idler wheel assembly about a pivot axis, and a first and a second chamber defined by said proximal and distal members;
   accumulator means for continuously supplying fluid to said recoil strut's eleventh chamber; and valve means for selectively providing fluid communication between said recoil strut's eleventh chamber and said second chamber.

6. The suspension system of claim 5 further comprising:
means for providing continuous fluid communication between said suspension strut's first and second chambers.

7. The suspension system of claim 5 wherein said distal members are biased away from their respective proximal members when fluid communication is provided between said first and eleventh chambers.

8. The suspension system of claim 5 wherein said struts are arranged such that, when fluid communication is provided between said first and eleventh chambers, relative displacement of one proximal member toward the pivot axis of its associated distal member causes displacement of said other proximal member away from the pivot axis of its associated proximal member.

9. A suspension system for a vehicle having a frame comprising:
a vehicle support apparatus including a wheel juncture device and a pivoting beam pivotally connected to said juncture device and having a first and a second arm;
means for connecting the vehicle support apparatus to said frame;
a first wheel assembly rotatably connected to said first arm;
a second wheel assembly rotatably connected to said second arm;
means for connecting said wheel juncture device to one of said arms comprising a pry-out strut having a first and a second member which define a ninth chamber;
accumulator means for supplying pressurized fluid; and
valve means for selectively providing and obstructing fluid communication between said ninth chamber and said accumulator means.

10. The suspension system of claim 9 wherein:
said pry-out strut's first and second members further define a tenth chamber, said tenth chamber being in continuous fluid communication with said accumulator means.

11. The suspension system of claim 9 wherein said first member is pivotally connected to said juncture device and said second member is pivotally connected to said one arm.

* * * * *

UNITED STATES PATENT AND TRADEMARK OFFICE
CERTIFICATE OF CORRECTION

PATENT NO. : 4,819,754
DATED : April 11, 1989
INVENTOR(S) : Robert J. Purcell and Robert R. Farris It is certified that error appears in the above-identified patent and that said Letters Patent is hereby corrected as shown below:

Column 10, Claim 1, Line 20 -- "fluid" should be --fluidly--.

Column 10, Claim 1, Line 20 -- after "fifth", insert --and seventh--.

Column 10, Claim 5, Line 12 -- "includes" should be --including--.

Signed and Sealed this

Twenty-third Day of January, 1990

Attest:

JEFFREY M. SAMUELS

Attesting Officer — Acting Commissioner of Patents and Trademarks